(12) United States Patent
Byun et al.

(10) Patent No.: US 9,986,448 B2
(45) Date of Patent: May 29, 2018

(54) METHOD AND APPARATUS FOR DISPLAYING TERMINAL IN SINGLE BASE STATION IN WIRELESS COMMUNICATION SYSTEM

(71) Applicant: LG ELECTRONICS INC., Seoul (KR)

(72) Inventors: Daewook Byun, Seoul (KR); Jian Xu, Seoul (KR); Jaehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/323,696

(22) PCT Filed: Jul. 9, 2015

(86) PCT No.: PCT/KR2015/007152
§ 371 (c)(1),
(2) Date: Jan. 3, 2017

(87) PCT Pub. No.: WO2016/006953
PCT Pub. Date: Jan. 14, 2016

(65) Prior Publication Data
US 2017/0156072 A1  Jun. 1, 2017

Related U.S. Application Data

(60) Provisional application No. 62/023,204, filed on Jul. 11, 2014.

(51) Int. Cl.
*H04M 3/42* (2006.01)
*H04W 24/04* (2009.01)
(Continued)

(52) U.S. Cl.
CPC ............. *H04W 24/04* (2013.01); *H04W 8/26* (2013.01); *H04W 76/027* (2013.01); *H04W 92/20* (2013.01)

(58) Field of Classification Search
CPC ................ H04L 47/125; H04W 28/02; H04W 28/0236; H04W 36/22
See application file for complete search history.

(56) References Cited

U.S. PATENT DOCUMENTS 8,442,049 B2 * 5/2013 Liu .................... H04B 7/15557
370/392
2011/0110249 A1  5/2011 Schuringa et al.
(Continued)

FOREIGN PATENT DOCUMENTS

EP    2 680 637 A1    1/2014
EP    2 744 253 A1    6/2014

*Primary Examiner* — Khalid Shaheed
(74) *Attorney, Agent, or Firm* — Birch, Stewart, Kolasch & Birch, LLP

(57) ABSTRACT

The present specification proposes a method of displaying a terminal involved in public disaster safety communication in a single base station that has a constraint on a normal backhaul connection. Even when the backhaul connection is disconnected, it is possible for a terminal to communicate by using an X2 connection between base stations, but there is a limitation in that it is difficult for a terminal to find the position of another terminal because a connection between the base station and an evolved packet core (EPC) is disconnected. Thus, there is a need for a method to solve this limitation. Whether there is a backhaul connection between a first base station and the EPC is detected, and when a backhaul connection is not detected, a first ID is allocated to a terminal in the service area of the first base station and the first ID allocated is transmitted to a second base station. When there is a backhaul connection between the first base station and the EPC, a globally unique temporary identifier (GUTI) of the terminal in the service area of the first base station is received from a mobility management entity (MME). Then, whether there is a backhaul connection between the first base station and the EPC is detected, and (Continued)

when a backhaul connection is not detected, the GUTI of the terminal in the service area of the first base station is transmitted to the second base station.

13 Claims, 12 Drawing Sheets

(51) Int. Cl.
*H04W 8/26* (2009.01)
*H04W 76/02* (2009.01)
*H04W 92/20* (2009.01)

(56) References Cited

U.S. PATENT DOCUMENTS

| | | | | |
|---|---|---|---|---|
| 2011/0250892 | A1* | 10/2011 | Gupta | H04W 36/0011 |
| | | | | 455/437 |
| 2012/0002537 | A1* | 1/2012 | Bao | H04W 24/04 |
| | | | | 370/221 |
| 2013/0128873 | A1* | 5/2013 | Eipe | H04W 76/02 |
| | | | | 370/338 |
| 2013/0136047 | A1 | 5/2013 | Zhang et al. | |
| 2013/0183971 | A1 | 7/2013 | Tamaki et al. | |
| 2014/0192735 | A1* | 7/2014 | Sridharan | H04W 8/26 |
| | | | | 370/329 |
| 2014/0295838 | A1* | 10/2014 | Won | H04W 60/04 |
| | | | | 455/435.1 |
| 2015/0312841 | A1* | 10/2015 | Sirotkin | H04W 40/246 |
| | | | | 370/254 |

* cited by examiner

METHOD AND APPARATUS FOR DISPLAYING TERMINAL IN SINGLE BASE STATION IN WIRELESS COMMUNICATION SYSTEM

CROSS REFERENCE TO RELATED APPLICATIONS

This application is the National Phase of PCT/KR2015/007152 filed on Jul. 9, 2015, which claims priority under 35 U.S.C. 119(e) to U.S. Provisional Application No. 62/023,204 filed on Jul. 11, 2014, all of which are hereby expressly incorporated by reference into the present application.

BACKGROUND OF THE INVENTION

Field of the Invention

The present invention relates to mobile communications, and more particularly, to a technique for displaying a terminal existing within a coverage of an isolated E-UTRAN in an isolated E-UTRAN scenario in which a connection with an evolved packet core (EPC) is disconnected.

Related Art

In mission critical networks, it is very important to ensure communication functionality of public safety managers. An isolated E-UTRAN implies an E-UTRAN without normal connectivity with an evolved packet core (EPC) or a nomadic eNB (NeNB) with E-UTRAN functionality. The NeNB is a nomadic cell, and may consist of an eNB, an antenna, and a microwave backhaul. The NeNB is used to provide a service coverage or a additional capacity in public safety.

An isolated E-UTRAN operation is used when a normal backhaul connection is limited. This is for allowing the E-UTRAN to operate in an isolated manner without backhaul connectivity so that the communication functionality is provided between the public safety managers even if a user moves to outside an E-UTRAN coverage or there is a loss in a backhaul communication path. The isolated E-UTRAN operation aims to adapt to the failure and maintain an acceptable service level of a network in the isolated E-URAN. A service restoration is an eventual goal.

An evolved packet core (EPC) refers to a core network structure in a 3GPP long term evolution (LTE) network. The EPC has a form evolved from a GPRS core network, and consists of elements such as a mobility management entity (MME), a serving gateway (S-GW), a PDN gateway (P-GW), a home subscriber server (HSS), or the like.

SUMMARY OF THE INVENTION

The present invention provides a method and apparatus for communication between public disaster safety managers when a connection between an eNB and an evolved packet core (EPC) is disconnected. The present invention provides a method and apparatus for communication between public disaster safety managers by receiving information of a terminal from a mobility management entity (MME) before a connection between an eNB and an EPC is disconnected, and by using the received information if the connection between the eNB and the EPC is disconnected.

According to an embodiment, provided is a method of transmitting information of a terminal by a first eNB in a wireless communication system. The method may include: detecting a backhaul connection between the first eNB and an EPC; if the backhaul connection is not detected, assigning a first identifier (ID) to a terminal existing within a service coverage of the first eNB; and transmitting the assigned first ID to a second eNB.

The method may further include receiving from the second eNB a second ID assigned to a terminal existing in a service coverage of the second eNB.

The first ID may be transmitted if the number of terminals existing in the service coverage of the first eNB is changed or if the backhaul connection of the first eNB is not detected.

The first ID may be transmitted to the second eNB by being included in at least any one of a UE ID request message and a UE ID indication message.

The first ID may include at least any one of an eNB UE X2AP ID, a cell radio network temporary identifier (C-RNTI), and a new ID.

The first eNB and the second eNB may include respective local EPCs.

An X2 connection may be established between the first eNB and the second eNB.

According to another embodiment, provided is a method of transmitting information of a terminal by a first eNB in a wireless communication system. The method may include receiving from an MME a globally unique temporary identifier (GUTI) of a terminal existing within a service coverage of the first eNB; detecting a backhaul connection between the first eNB and an EPC; and if the backhaul connection is not detected, transmitting the GUTI of the terminal existing within the service coverage of the first eNB to a second eNB.

The method may further include receiving from the second eNB a GUTI, received from the MME, of a terminal existing within a service coverage of the second eNB.

The GUTI of the terminal existing within the service coverage of the first eNB may be transmitted if the number of terminals existing in the service coverage of the first eNB is changed or if the backhaul connection of the first eNB is not detected.

The GUTI of the terminal existing within the service coverage of the first eNB may be received from the MME by being included in at least any one of an initial context setup request message, a downlink NAS transport message, and a path switch request acknowledge message.

The GUTI of the terminal existing within the service coverage of the first eNB may be transmitted to the second eNB by being included in at least any one of a UE ID request message and a UE ID indication message.

The first eNB and the second eNB may include respective local EPCs.

An X2 connection may be established between the first eNB and the second eNB.

According to another embodiment, provided is an apparatus for transmitting information of a terminal in a wireless communication system. The apparatus may include: a memory; a transceiver; and a processor for connecting the memory and the transceiver. The processor may be configured for: detecting a backhaul connection between the first eNB and an EPC; if the backhaul connection is not detected, assigning a first ID to a terminal existing within a service coverage of the first eNB; and transmitting the assigned first ID to a second eNB.

Communication between public disaster safety managers can be smoothly achieved even if a connection between an eNB and an EPC is disconnected.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
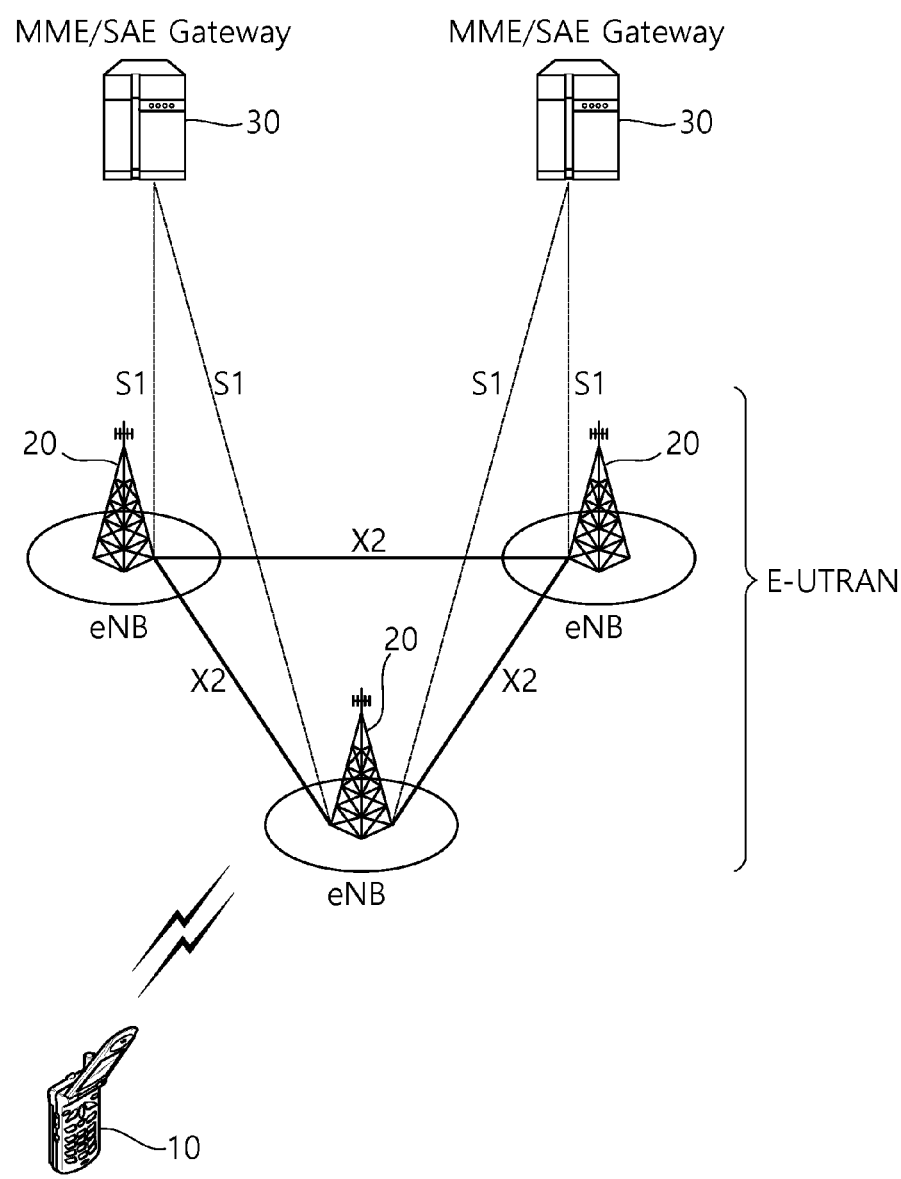
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

An EPC includes a mobility management entity (MME) and a system architecture evolution (SAE) gateway (S-GW). One or more MMEs/S-GWs 30 may be disposed at the end of a network and may be connected with an external network. For clarity, an MME/S-GW 30 may be simply referred to as a gateway hereinafter, in which it would be understood that the gateway includes both an MME and an S-GW.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface.

Figure 2:
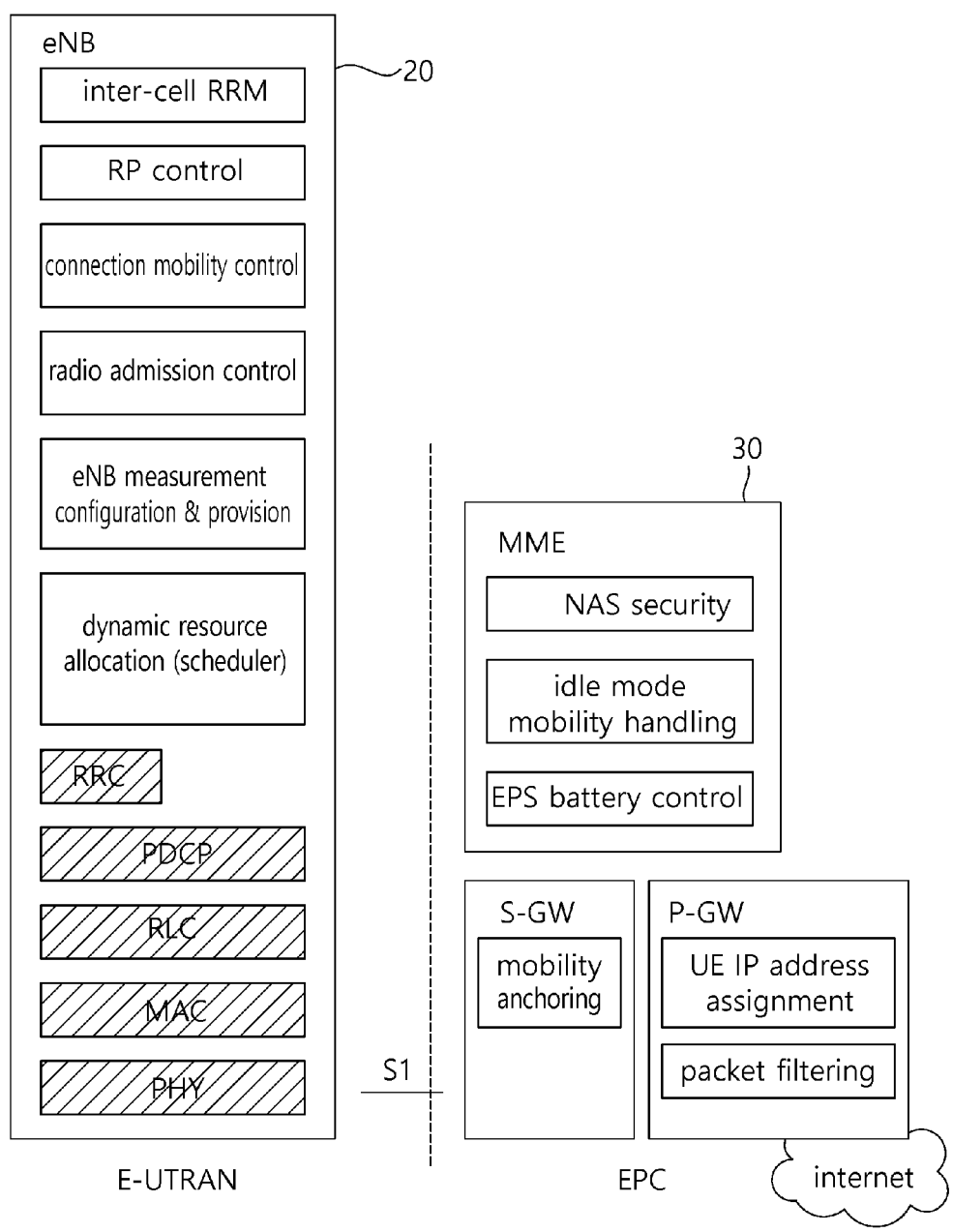
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
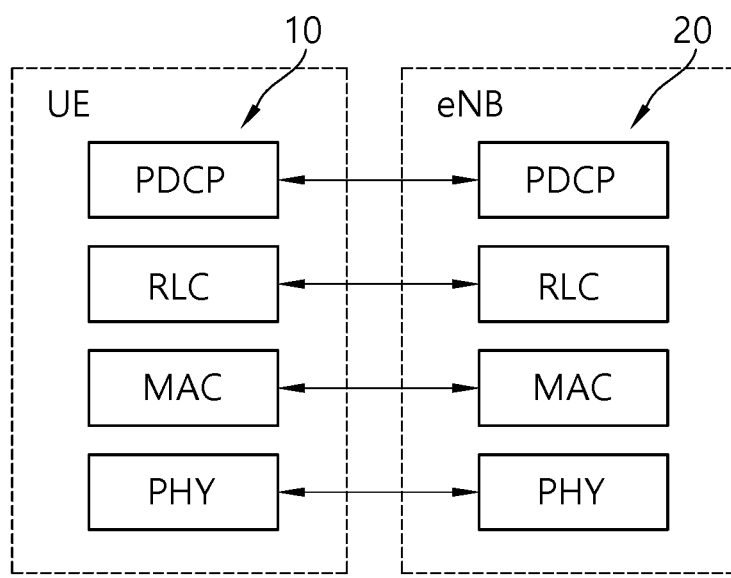
FIG. 3 shows a block diagram of a user plane protocol stack of an LTE system.
Figure 4:
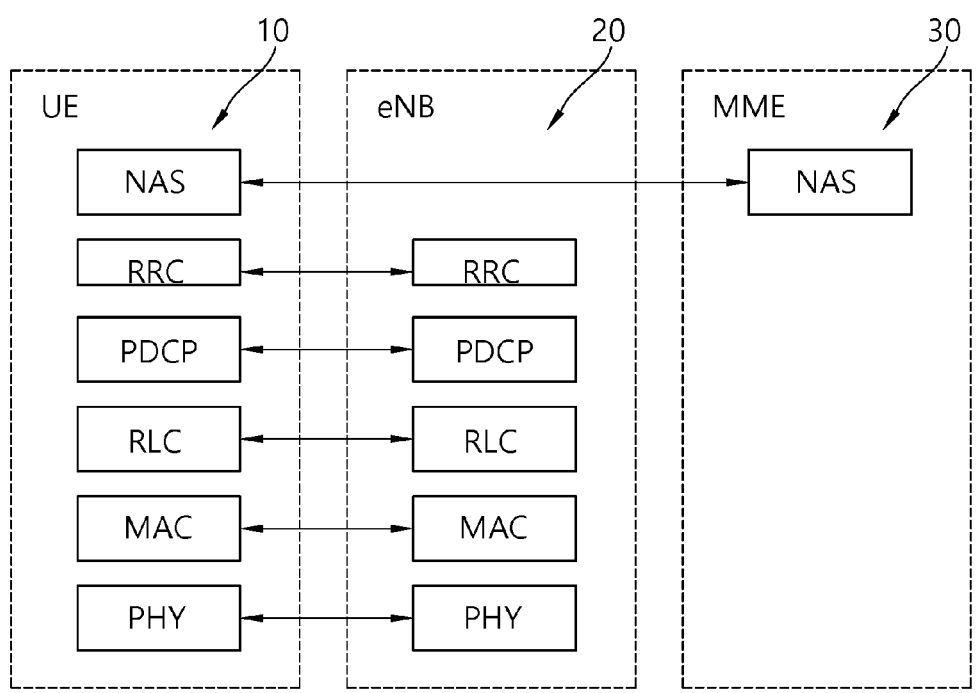
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
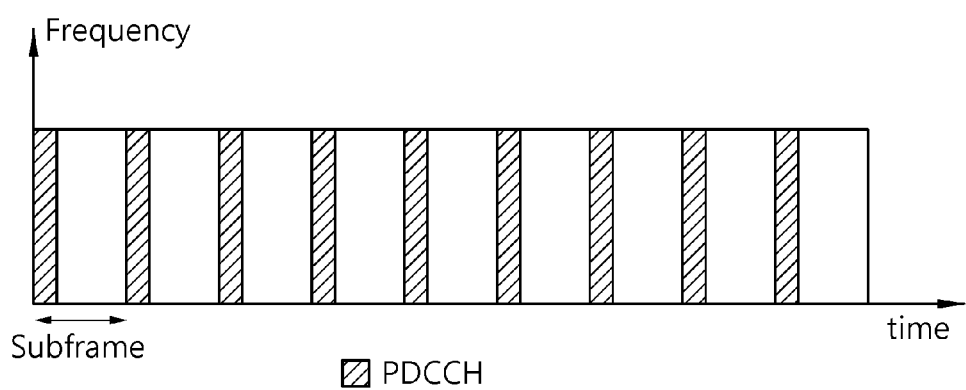
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Figure 6:
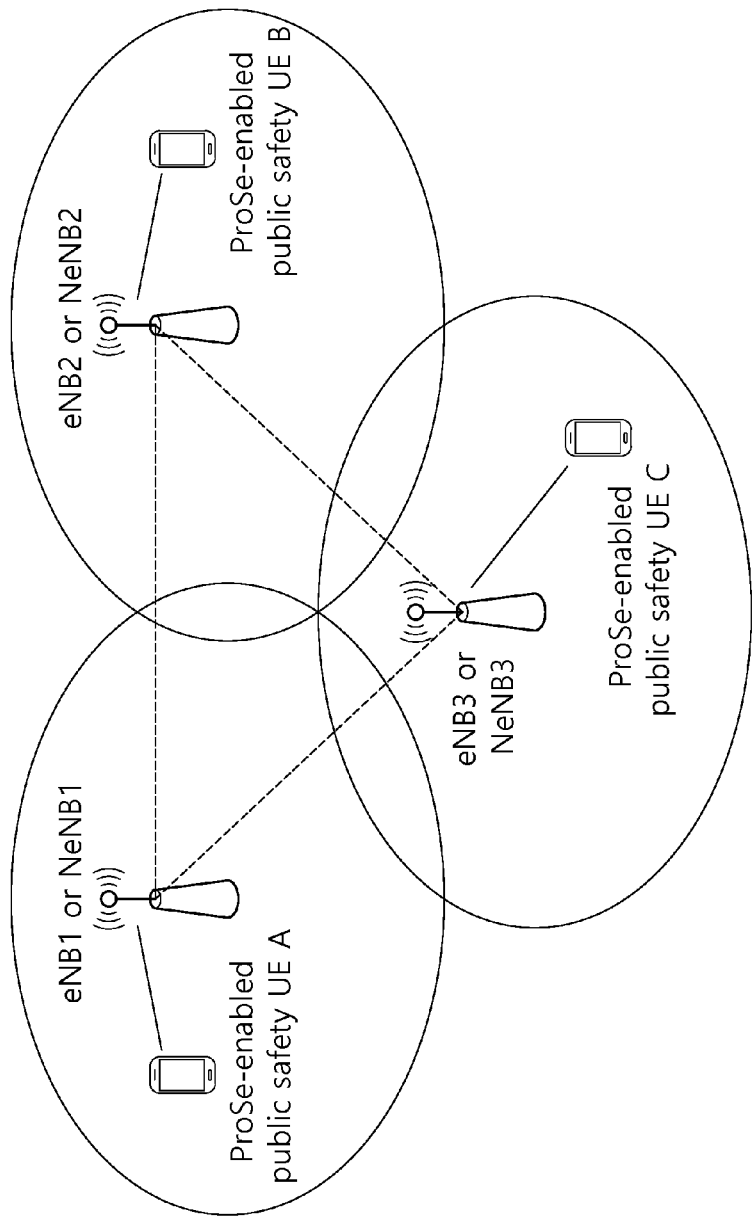
FIG. 6 shows a case of using a broadband isolated E-UTRAN which uses an eNB or an NeNB.

FIG. 6 shows a case of using a broadband isolated E-UTRAN which uses an eNB or an NeNB.

A nomadic eNB (NeNB) is a nomadic cell, and consists of an eNB, an antenna, and a microwave backhaul. The NeNB may support a regional service. Referring to FIG. 6, all of an eNB1, an eNB2, and an eNB3 are isolated from an infrastructure network. That is, there is no backhaul connection. However, the eNBs maintain mutual connectivity. Public safety UEs A, B, and C for which a proximity-based service (ProSe) is enabled are served by the isolated E-UTRAN, and since they are not adjacent to each other, ProSe group communication provided by a direct mode ProSe is impossible. In this case, each UE must perform communication with another UE through an X2 interface between the eNBs or the NeNBs. However, since there is no connection with the EPC, the eNB1 or NeNB1 in the example of FIG. 6 cannot know locations of the UE B and the UE C other than the UE A. Therefore, communication between the UEs is impossible. The present invention proposes a method of solving this problem. In the present invention, a UE implies a UE which involves in public disaster safety communication, and a UE for performing normal telephony or a public disaster safety manager is excluded from its scope.

Figure 7:
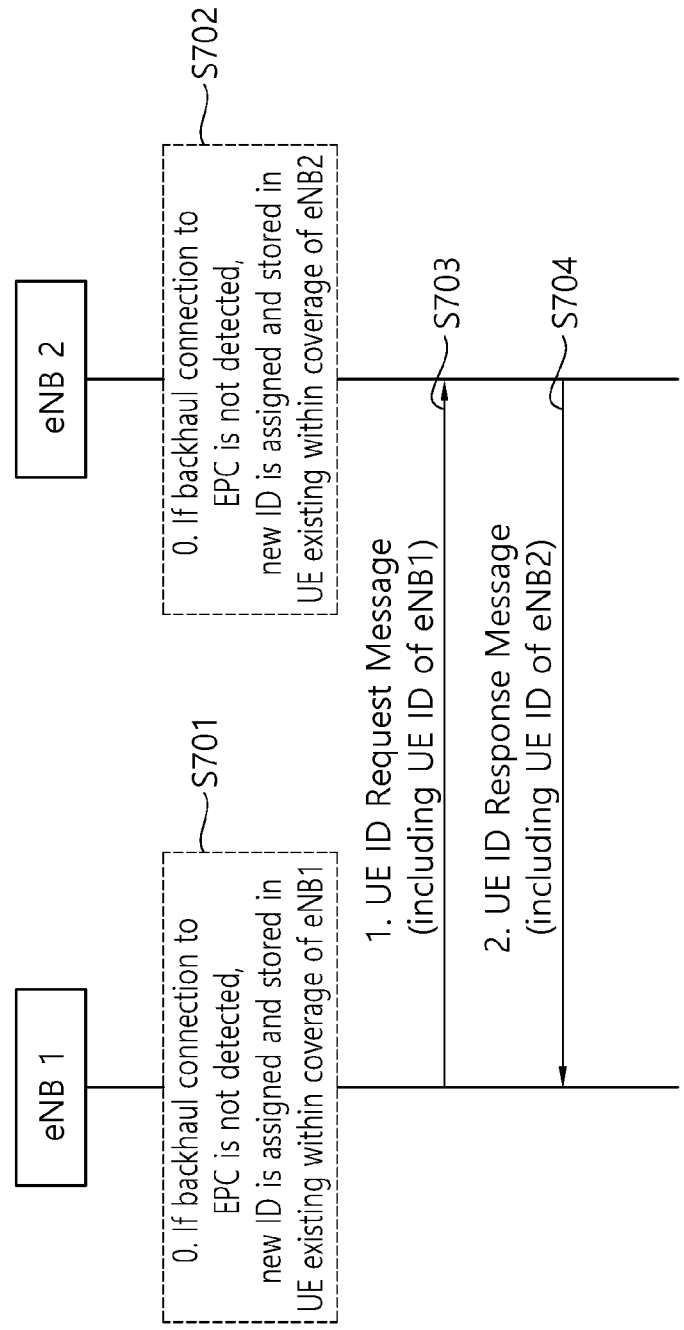
FIG. 7 shows an example of a process for transmitting and receiving an ID of a UE in an isolated E-UTRAN according to an embodiment of the present invention.

FIG. 7 shows an example of a process for transmitting and receiving an ID of a UE in an isolated E-UTRAN according to an embodiment of the present invention.

This method may be applied when the isolated E-UTRAN is established by using an eNB or an NeNB. The eNB may provide IDs of UEs which exist within a coverage of the eNB to another eNB connected through X2 in order to indicate that the UEs operate within its coverage and to ensure uniqueness of the UE. Different eNBs may include respective local EPCs. This will be described hereinafter in detail with reference to FIG. 7.

Step 0: If a backhaul connection to an EPC is not detected, respective eNBs may assign a new ID to UEs existing in its coverage, and may store the new ID. That is, if the backhaul connection to the EPC is not detected, an eNB1 may assign a new ID to UEs existing in a coverage of the eNB1 and may store the new ID (S701). An eNB2 may also perform the same process as the eNB1 (S702). Herein, the new ID is a unique ID for confirming a UE between isolated E-UTRANs and/or neighboring eNBs for a public safety scenario.

Step 1: After the backhaul connection between the EPC and the eNB1 is disconnected, if the number of UEs existing with a service coverage of the eNB1 is changed or if the backhaul connection is not detected in the eNB1, the eNB1 may transmit to the eNB2 a UE ID request message (or old message) including the assigned UE ID (S703). This is to allow the UEs existing within a coverage of each eNB to be able to perform communication through an X2 connection. The UE ID may be an eNB UE X2AP ID and/or a cell radio network temporary identifier (C-RNTI) or a new ID. The eNB1 may store UE IDs assigned autonomously by the eNB1.

Step 2: If the eNB2 receives from the eNB1 the UE ID request message, the eNB2 may store UE IDs received from the eNB1. If the backhaul connection to the EPC is not detected and thus the UE ID request message is transmitted, the eNB2 may transmit to the eNB1 a UE ID response message (or old message) including UE IDs existing within its coverage (S704). The eNB2 may store the transmitted UE IDs. If the eNB1 receives the UE ID response message, the eNB1 may store the UE IDs received from the eNB2. Otherwise, the UE ID response message does not include the UE IDs.

Figure 8:
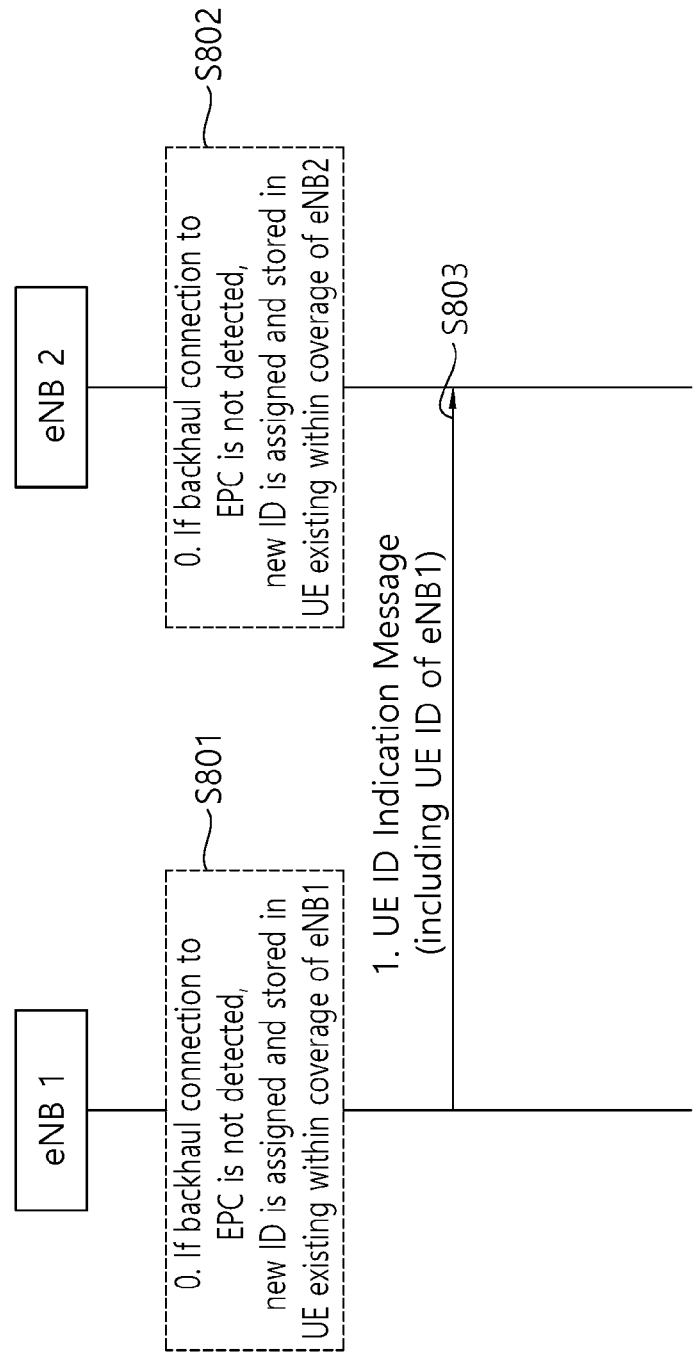
FIG. 8 shows an example of a procedure for transmitting UE IDs in an isolated E-UTRAN according to an embodiment of the present invention.

FIG. 8 shows an example of a procedure for transmitting UE IDs in an isolated E-UTRAN according to an embodiment of the present invention.

This method may be applied when the isolated E-UTRAN is established by using an eNB or an NeNB. This is almost similar to the method of FIG. 7 except that a class-2 message is used such as a UE ID indication message (or old message) used to provide a UE ID between neighboring eNBs. Different eNBs may include respective local EPCs. This will be described hereinafter in detail with reference to FIG. 8.

Step 0: If a backhaul connection to an EPC is not detected, respective eNBs may assign a new ID to a UE existing in its coverage, and may store the new ID. That is, if the backhaul connection to the EPC is not detected, an eNB1 may assign a new ID to UEs existing in a coverage of the eNB1 and may store the new ID (S801). An eNB2 may also perform the same process as the eNB1 (S802). Herein, the new ID is a unique ID for confirming a UE between isolated E-UTRANs and/or neighboring eNBs for a public safety scenario.

Step 1: After the backhaul connection between the EPC and the eNB1 is disconnected, if the number of UEs existing in a service coverage of the eNB1 is changed or if the backhaul connection is not detected in the eNB1, the eNB1 may transmit to the eNB2 a UE ID indication message (or old message) including the assigned UE ID (S803). This is to allow the UEs existing in a coverage of each eNB to be able to perform communication through an X2 connection. The UE ID may be an eNB UE X2AP ID and/or a C-RNTI or a new ID.

The embodiment of FIG. 7 in which the UE ID is exchanged between the eNBs is different from the embodiment of FIG. 8 in which the UE ID is transmitted unilaterally to a peer eNB. Although the process of transmitting the UE ID indication message including the UE ID assigned to the eNB2 is described in the embodiment of FIG. 8 when the eNB1 fails to detect the backhaul connection, the present invention is not limited thereto. Thus, even if the eNB2 fails to detect the backhaul connection, the UE ID indication message including the assigned UE ID may be transmitted to the eNB 1.

Figure 9:
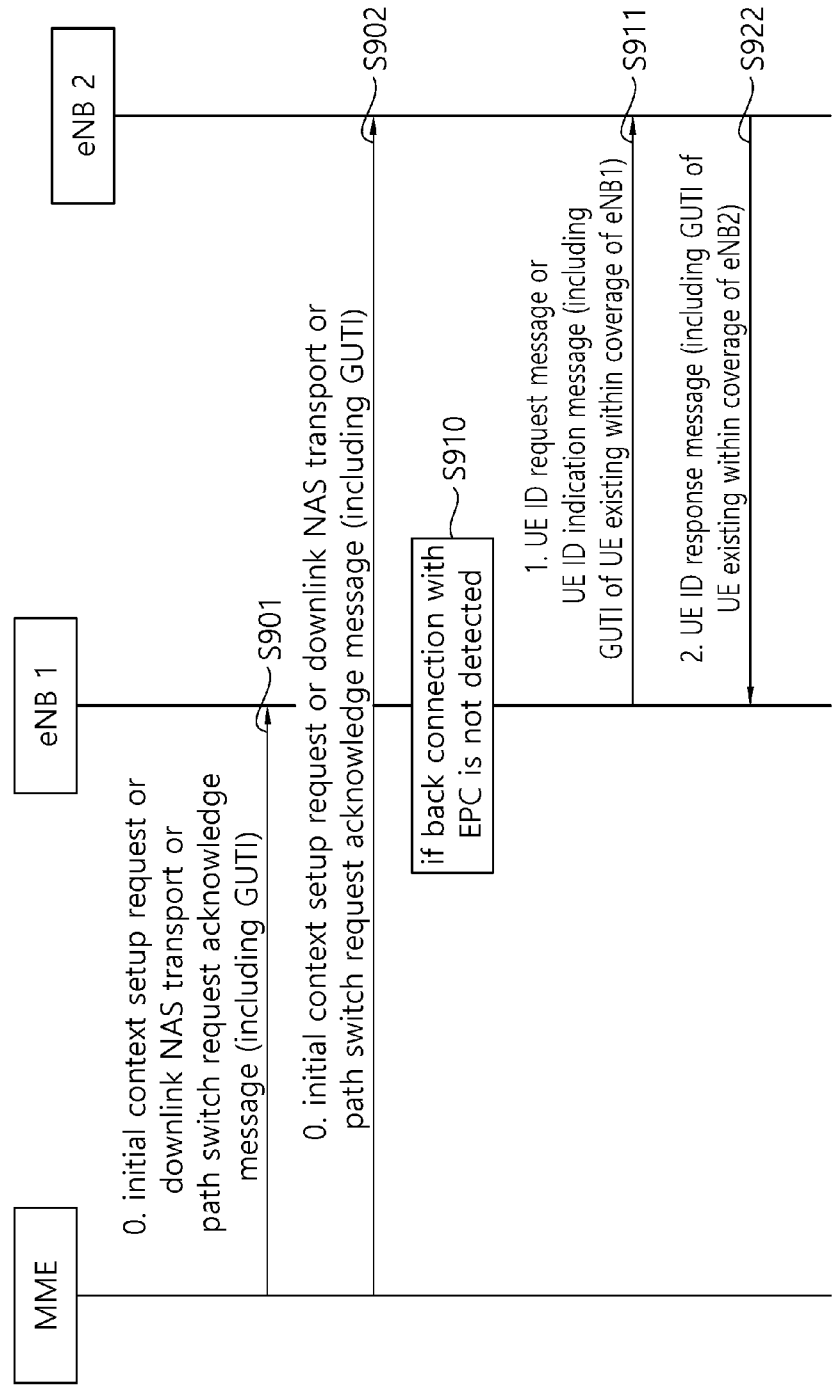
FIG. 9 shows an example of a process for transmitting and receiving a globally unique temporary identifier (GUTI) of a UE in an isolated E-UTRAN according to an embodiment of the present invention.

FIG. 9 shows an example of a process for transmitting and receiving a globally unique temporary identifier (GUTI) of a UE in an isolated E-UTRAN according to an embodiment of the present invention.

This method may be applied when the isolated E-UTRAN is established by using only an eNB. It is assumed in this embodiment that a connection between the eNB and an MME is not disconnected yet. Accordingly, the MME may provide a GUTI to eNBs. The GUTI may be used as an ID of a UE existing in a coverage of the eNBs. Different eNBs may include respective local EPCs. This will be described hereinafter in detail with reference to FIG. 9.

Step 0: An MME may transmit a GUTI of UEs in a coverage of each eNB to the eNBs. The GUTI may be included in at least any one of an initial context setup request message, a downlink NAS transport message or a path switch request acknowledge message (S901, S902). These steps must be performed before a backhaul connection to an EPC is disconnected. If a backhaul connection between the eNB and the EPC is not detected (S910), the procedure precedes to a next step.

Step 1: After the backhaul connection between the EPC and the eNB1 is disconnected, if the number of UEs existing in a service coverage of the eNB1 is changed or if the backhaul connection is not detected in the eNB1, the eNB1 may transmit to the eNB2 a UE ID request message, UE ID indication message, or old message including the GUTI of the UE (S911). When the procedure starts, if the GUTI of the UE does not exist in the coverage, it may be requested to the UE. The eNB2 may store the received GUTI of the UE.

Step 2: If the eNB2 receives a UE ID request message, this process is identical to the Step 2 of the embodiment of FIG. 9 except that the UE ID response message includes the GUTI of the UE. That is, if the eNB2 receives the UE ID request message from the eNB1, the eNB2 may store UE GUTIs received from the eNB1. If the backhaul connection to the EPC is not detected and thus the UE ID request message is transmitted, the eNB2 may transmit to the eNB1 a UE ID response message (or old message) including UE GUTIs existing within its coverage (S912). If the eNB1 receives the UE ID response message, the eNB1 may store the UE GUTIs received from the eNB2.

According to the embodiments of FIG. 7 to FIG. 9, communication can be performed reliably between public disaster safety managers by applying the present invention in such a manner that, in an isolated E-UTRAN scenario, information of a UE existing within its coverage is transmitted to another eNB, and information of a UE existing within a coverage of another eNB is received.

Figure 10:
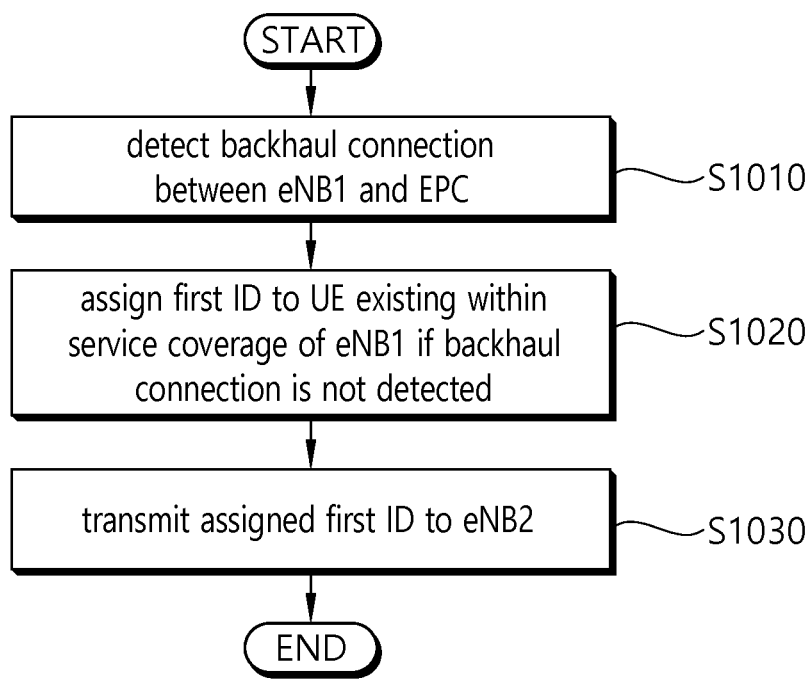
FIG. 10 is a block diagram illustrating a method for transmitting a UE ID in an isolated E-UTRAN according to an embodiment of the present invention.

FIG. 10 is a block diagram illustrating a method for transmitting a UE ID in an isolated E-UTRAN according to an embodiment of the present invention.

Referring to FIG. 10, an eNB1 detects a backhaul connection between the eNB 1 and an EPC (S1010). If the backhaul connection is not detected, the eNB1 assigns a first ID to UEs existing within a service coverage of the eNB1 (S1020). The ID is a unique ID for specifying a UE in an isolated E-UTRAN scenario. After the backhaul connection between the eNB1 and the EPC is disconnected, if the number of UEs existing with the coverage of the eNB1 is changed or if the eNB1 does not detect the backhaul connection, the eNB1 transmits the assigned first ID to an eNB2 (S1030).

Figure 11:
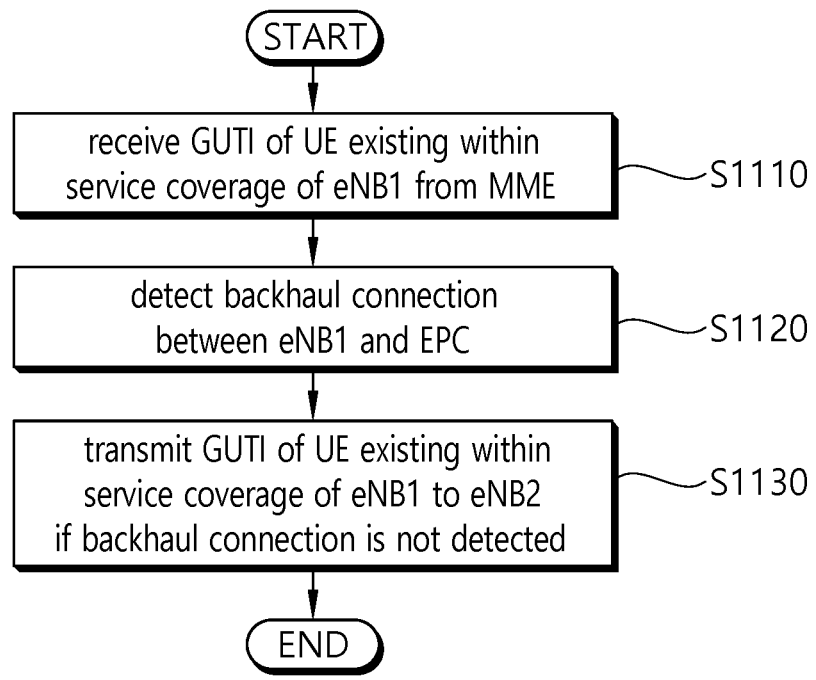
FIG. 11 is a block diagram illustrating a method for transmitting a GUTI of a UE in an isolated E-UTRAN according to an embodiment of the present invention.

FIG. 11 is a block diagram illustrating a method for transmitting a GUTI of a UE in an isolated E-UTRAN according to an embodiment of the present invention.

Referring to FIG. 11, an eNB1 receives a GUTI of a UE existing within a service coverage of the eNB (S1110). In this step, a backhaul connection between the eNB1 and an EPC must be maintained. The eNB1 detects the backhaul connection between the eNB1 and the EPC (S1120). If the backhaul connection is not detected, the GUTI of the UE existing within the service coverage of the eNB1 is transmitted to an eNB2 (S1130).

According to the present invention, a UE existing in a coverage of each eNB can perform disaster safety communication reliably by using an X2 connection between eNBs even if a connection between the eNB and an EPC is disconnected.

Figure 12:
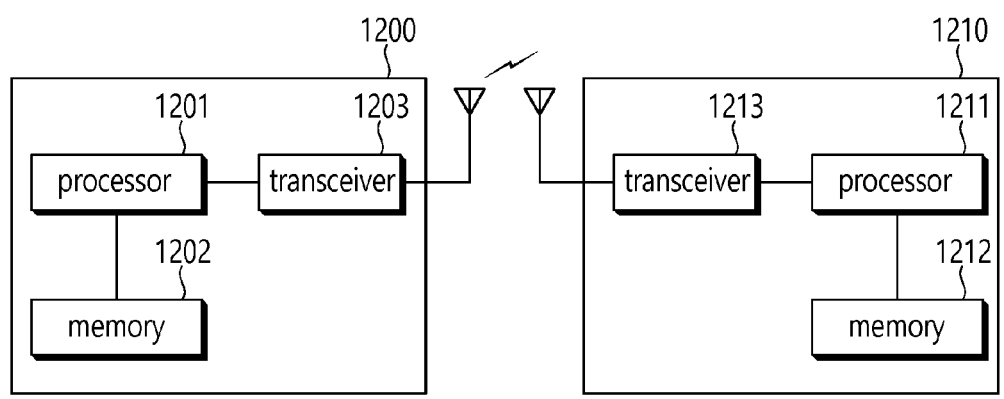
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the base station may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of transmitting information of a first terminal by a first evolved node-B (eNB) in a wireless communication system, the method comprising:
    detecting whether or not a backhaul connection between the first eNB and an evolved packet core (EPC) is disconnected;
    if the first eNB detects that the backhaul connection is disconnected, assigning a first identifier (ID) to the first terminal within a service coverage of the first eNB, wherein the assigned first ID is a new unique ID assigned autonomously by the first eNB for identifying the first terminal between the first eNB and a second eNB;
    transmitting the assigned first ID to the second eNB; and
    receiving a second ID assigned to a second terminal within a service coverage of the second eNB from the second eNB, in response to the transmitted first ID, wherein the second ID is a new unique ID assigned autonomously by the second eNB for identifying the second terminal between the first eNB and the second eNB.

2. The method of claim 1, wherein the first ID is transmitted if a number of terminals within the service coverage of the first eNB is changed.

3. The method of claim 1, wherein the first ID that is transmitted to the second eNB is comprised in at least any one of a user equipment (UE) ID request message and a UE ID indication message.

4. The method of claim 1, wherein the first ID comprises at least any one of an eNB user equipment (UE) X2 application protocol (X2AP) ID, a cell radio network temporary identifier (C-RNTI), and a new ID.

5. The method of claim 1, wherein the first eNB and the second eNB comprise respective local EPCs.

6. The method of claim 1, wherein an X2 connection is established between the first eNB and the second eNB.

7. A method of transmitting information of a first terminal by a first evolved node-B (eNB) in a wireless communication system, the method comprising:
    receiving, from a mobility management entity (MME), a globally unique temporary identifier (GUTI) of the first terminal within a service coverage of the first eNB;
    detecting whether or not a backhaul connection between the first eNB and an evolved packet core (EPC) is disconnected; and
    if the first eNB detects that the backhaul connection is disconnected, transmitting the GUTI of the first terminal within the service coverage of the first eNB to a second eNB; and
    receiving, from the second eNB, a GUTI, received from the MME, of a second terminal within a service coverage of the second eNB, in response to the transmitted GUTI of the first terminal.

8. The method of claim 7, wherein the GUTI of the first terminal within the service coverage of the first eNB is transmitted if a number of terminals within the service coverage of the first eNB is changed.

9. The method of claim 7, wherein the GUTI of the first terminal within the service coverage of the first eNB is received from the MME by being comprised in at least any one of an initial context setup request message, a downlink non-access stratum (NAS) transport message, and a path switch request acknowledge message.

10. The method of claim 7, wherein the GUTI of the first terminal within the service coverage of the first eNB that is transmitted to the second eNB is comprised in at least any one of a user equipment (UE) ID request message and a UE ID indication message.

11. The method of claim 7, wherein the first eNB and the second eNB comprise respective local EPCs.

12. The method of claim 7, wherein an X2 connection is established between the first eNB and the second eNB.

13. An apparatus for transmitting information of a first terminal in a wireless communication system, the apparatus comprising:
    a memory;
    a transceiver; and
    a processor, operatively connected to the memory and the transceiver, and that:
        detects whether or not a backhaul connection between a first evolved node-B (eNB) and an evolved packet core (EPC) is disconnected,
        if the first eNB detects that the backhaul connection is disconnected, assigns a first identifier (ID) to the first terminal within a service coverage of the first eNB, wherein the assigned first ID is a new unique ID assigned autonomously by the first eNB for identifying the first terminal between the first eNB and the second eNB,
        controls the transceiver to transmit the assigned first ID to a second eNB, and
        controls the transceiver to receive a second ID assigned to a second terminal within a service coverage of the second eNB from the second eNB, in response to the transmitted first ID, wherein the second ID is a new unique ID assigned autonomously by the second eNB for identifying the second terminal between the first eNB and the second eNB.

* * * * *